US005152464A

United States Patent [19]

Farley

[11] Patent Number: 5,152,464

[45] Date of Patent: Oct. 6, 1992

[54] SHOWER FILTER ASSEMBLY

[76] Inventor: Frederick A. Farley, 2363 Blackfoot, Placentia, Calif. 92670

[21] Appl. No.: 714,195

[22] Filed: Jun. 12, 1991

[51] Int. Cl.[5] B05B 1/14; B01D 35/02

[52] U.S. Cl. 239/553.3; 239/310; 239/586; 239/587.4; 210/449

[58] Field of Search 239/310, 315, 316, 569, 239/586, 587, 553, 553.3; 210/266, 282, 449

[56] References Cited

U.S. PATENT DOCUMENTS

| | | | |
|---|---|---|---|
| 277,203 | 5/1883 | Benson | 210/449 |
| 1,774,004 | 8/1930 | Haslett | 210/449 |
| 2,986,340 | 5/1961 | Webb . | |
| 3,083,916 | 4/1963 | Neel | 239/315 |
| 3,208,595 | 9/1965 | Butler | 210/449 |
| 3,533,555 | 10/1970 | Billeter | 239/587 |
| 3,695,450 | 10/1972 | Lieberman . | |
| 3,760,951 | 9/1973 | Mansfield . | |
| 3,780,869 | 12/1973 | Krongos . | |
| 3,822,018 | 7/1974 | Krongos . | |
| 4,107,046 | 8/1978 | Corder . | |
| 4,172,796 | 10/1979 | Corder . | |
| 4,191,332 | 3/1980 | De Langis et al. | 239/586 |
| 4,244,526 | 1/1981 | Arth . | |
| 4,497,444 | 2/1985 | Arnold | 239/569 |
| 4,504,389 | 3/1985 | Rundzaitis . | |
| 4,591,098 | 5/1986 | Ridenour | 239/586 |
| 5,008,011 | 4/1991 | Underwood | 210/449 |

*Primary Examiner*—Andres Kashnikow
*Assistant Examiner*—Karen B. Merritt
*Attorney, Agent, or Firm*—James G. O'Neill

[57] ABSTRACT

A shower filter assembly having a thin or low-profile design including a recessed inlet which leads into an internal chamber in which a baffle is mounted to deflect water flowing into the chamber substantially evenly through a dechlorinating media held within the chamber. An outlet from the chamber includes a shut-off valve and a compact shower head securely mounted to the end of the outlet.

15 Claims, 1 Drawing Sheet

SHOWER FILTER ASSEMBLY

BACKGROUND OF THE INVENTION

1. Field of the Invention

This invention relates generally to water filters and more particularly to an improved, compact shower filter assembly.

2. Description of Related Art

Water filtering means for attachment to a house faucet, or for use in conjunction with shower heads are known. These known filtering means may be inserted into a waterline, or replace an existing faucet or shower head, to filter water passing through the related fixture. In many cases, by-pass means are included in such devices, and valves are switched or changed when it desired to allow unfiltered water to exit therefrom. However, after many attempts to solve the problems of size, ease in installation, and high cost of manufacture, in particular, of filtering devices used on or in connection with a shower head, there still exists the need for a less cumbersome, easy to install and remove, low-cost shower filter device, that is also compact to thereby take up a minimum amount of space.

One such prior art device is shown in U.S. Pat. No. 2,986,340, which discloses a shower head for supporting and positioning water soluble conditioning pellets or tablets therein and through which some of the water flows when transversing the shower head. The shower head disclosed therein, however, does not filter the water passing therethrough other than by conventional screen filter means and does not present or contemplate a low profile device.

In U.S. Pat. No. 3,695,450, there is disclosed a water tap filter for connection to a water tap. The tap filter includes a filter pad supported on a mesh or screen held therein. A mixer is placed after the filter pad and mesh for aerating water after it passes through the filter.

U.S. Pat. No. 3,760,951, discloses a filter for insertion into a waterline by means of quick-disconnect bayonet fittings that allow the filter to be easily removed for cleaning or replacement.

U.S. Pat. No. 3,780,869, discloses a water filter, for insertion into a waterline, having a plurality of compartments with multiple filtering elements therein. The filter includes two separate body parts which are held together by threaded portions that allow the body to be taken apart and put back together to replace or clean the multiple filter elements contained therein. The filter also includes a valve for shifting between filter and non-filter positions.

U.S. Pat. No. 3,822,018, discloses a water filter, for insertion into a waterline, having two hemispherical sections joined together by threaded portions. The filter has a plurality of cylindrical filter elements annularly arranged therein, and includes a valve for directing water through the filter elements or for directing water through the device unfiltered.

U.S. Pat. No. 4,107,046, discloses a filter cartridge for an internally by-passable water purifier apparatus. The apparatus includes valve means for directing water through the filter cartridge before it exits the apparatus, and another valve means for directing water to the outlet of the apparatus along a path that by-passes the filter cartridge.

U.S. Pat. No. 4,172,796, discloses a water faucet having a water purification or filtering means formed therein, with valve means for selecting the flow of water therethrough to either discharge filtered or unfiltered water.

U.S. Pat. No. 4,244,526, discloses a flow control shower head having a flow regulator provided therein to maintain a water flow rate therethrough within preset limits.

U.S. Pat. No. 4,504,389, discloses a water faucet having a separate housing containing a removable cartridge or filter element therein, and valve means for selecting whether the faucet provides filtered or unfiltered water. The filter cartridge is replaceable by removing a cap covering the separate housing holding the cartridge, lifting out the old cartridge, and inserting a new cartridge.

While the foregoing prior art devices provide filtration of water passing through them, they are not adapted to be used to replace existing shower heads and overcome the known difficulties, such as, but not limited to, ease in manufacture and installation, and the provision of the desired degree of filtration of the water passing therethrough with a compact, low profile device, which at the same time provides long-term filtering capabilities. Furthermore, while the above-mentioned prior art provide some limited improvements in the filtering art, there remains the need in the art for a shower filter assembly that provides a maximum of filtering and other capabilities in a compact design at a reasonable price. In particular, the improved and simplified assembly of the present invention, provides a shower filter that not only filters water, but which is also adapted to allow the water to be shut-off, in a single device that takes up no more, and in some cases less space than existing type shower heads that do not include filters and/or shut-off valves.

SUMMARY OF THE INVENTION

Accordingly, it is a general object of the present invention to provide an improved shower filter assembly. It is a particular object of the present invention to provide a combination filter, shower head and shut-off valve. It is a still more particular object of the present invention to prove a compact shower head and water filter that takes up a minimum amount of space. It is a further object of the present invention to provide a compact shower filter that may be nested with further compact shower filters to provide additional filtering capability, as required.

In accordance with one aspect of the invention, there is provided a shower filter assembly having a compact design because of the use of a unique design that takes advantage of an internal baffle means and a shower filter inlet that is recessed into the assembly. The filter includes an internal chamber containing a filtering medium for both filtering out chlorine or other unwanted materials in the water and for limiting the flow of water therethrough, to also provide water and energy savings. The shower filter assembly is made as thin as possible to take up a minimum amount of space, and is provided with internal placement and reinforcing means to properly locate the baffle and strengthen the filter housing. The assembly may also be provided with water shut-off means after the filter chamber, and a compact shower head attached to the filter, downstream of the shut-off means.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an improved shower filter assembly.

Figure 2:
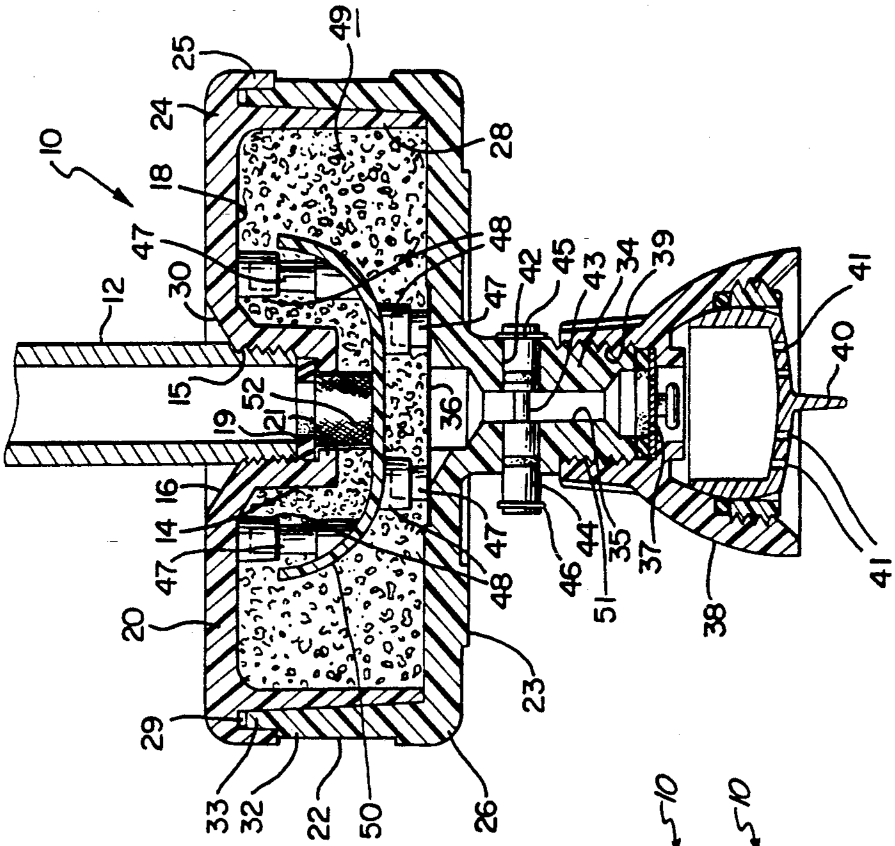
FIG. 2 is a sectional view taken along line 2—2 of FIG. 1, looking in the direction of the arrows.
Figure 1:
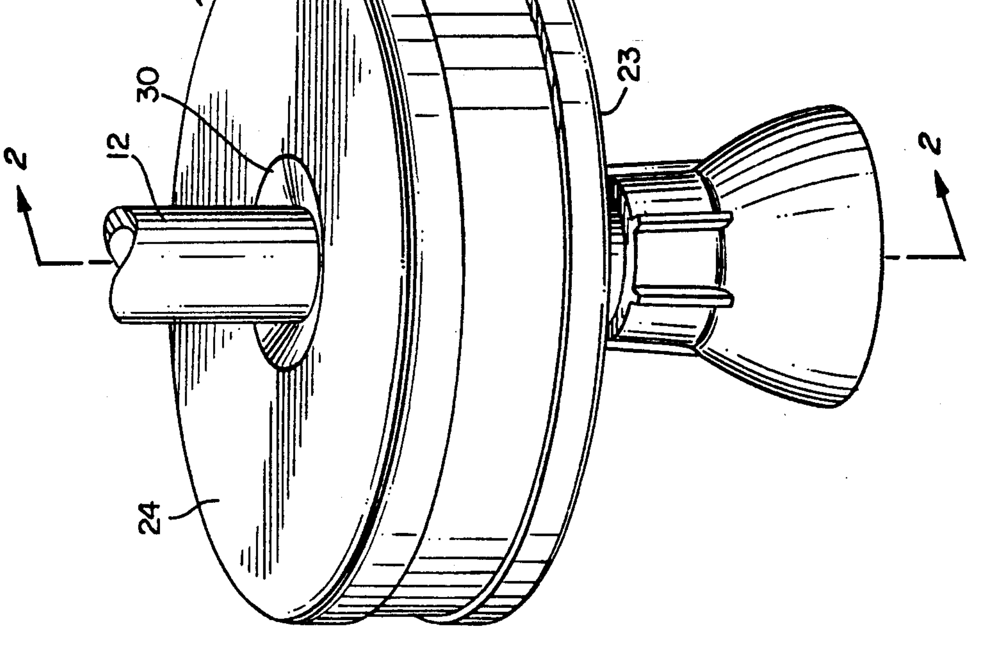
FIG. 1 is a perspective view of the preferred embodiment of the shower head filter assembly of the present invention attached at the end of a waterline.

Turning now to the drawings, FIGS. 1 and 2 show a combination shower head, filter and shut-off valve assembly 10, fixed to the end of a shower arm or waterpipe 12, for purposes of illustration only. It will be readily apparent to those skilled in the art that the assembly 10 may be fixed to the end of shower arm 12, or the like, in any conventional manner. The improved assembly 10 includes an inlet 14 that is preferably formed integrally with the assembly 10 and recessed therein. An internally threaded passage 15 extends entirely through the recessed inlet 14 into a hollow inner chamber 18. The internal threads of passage 15 may be secured to a threaded end 16 of the shower arm 12, with sealing means 19 held between the threaded end 16 of shower arm 12 and a reduced diameter shoulder 21 formed at the end of passage 15.

The assembly 10 is preferably cylindrical in shape and the internal, hollow filter chamber 18 contained therein is bounded by a flat, circular top wall 20, an annular side wall 22 and a flat, circular bottom wall 23, formed in any desired manner, such as by permanently securing together upper and lower sections 24 and 26. Sections 24 and 26 may be fabricated in any desired manner, using any acceptable material, such as by molding a plastic material.

The upper section 24 of assembly 10 includes the flat, circular top wall 20 formed integrally with a downwardly extending annular portion 28, an annular segment 25 and the recessed inlet 14, which is formed substantially in the center of said flat circular top wall. If desired, to guide insertion of the assembly 10 into a pipe, a cavity or depression 30 may be formed in the exterior of top wall 20, leading to the internal passage 15 of inlet 14.

The lower section 26 includes an upwardly extending annular portion 32 formed integrally with bottom wall 23. An outlet 34 is also formed integrally on and substantially in the center of the exterior surface of flat, circular bottom wall 23 and extends outwardly or away from bottom wall 23.

As shown in FIG. 2, outlet 34 includes a stepped internal passage 35 connected to internal chamber 18 to allow filtered or dechlorinated water exiting from chamber 18 to first flow through a screen 36, and to then exit from assembly 10 through a shower head 38, secured to a threaded end 51 of outlet 34. Shower head 38 is also compact in design, to take up a minimum of space and, instead of a conventional ball joint at the rear of the shower head, merely includes internal threads 39 formed within the body of the shower head. A further screen 37 is held within shower head 38 and conventional sealing means and a shoulder formed in the shower head. A rotating spray adjustment means 40, having a plurality of openings 41 formed therein is sealingly and rotatably held in the shower head 38, in a known manner.

A circular opening or passage 42 is formed, in any convenient manner, as by drilling, through outlet 34, perpendicular to passage 35. A shut-off valve 44 is sealingly, slidably mounted within opening 42, and is adapted to open and close the stepped down portion of passage 35 to thereby control passage of water therethrough. As shown in FIG. 2, valve 44 is in the open position with a stop means 45 resting against the exterior of outlet 34. A reduced portion 43 of valve 44 is shown in the open position to allow water to flow through passage 35. When it is desired to completely shut-off or stop the flow of water through the assembly 10, valve 44 is pushed from the left side, when looking at the drawing, until a second stop means 46 fixed at the other end of valve 44 abuts against the outside surface of outlet 34. In this position, an enlarged portion of valve 44 acts to completely block or shut-off water flow, in a known manner.

Annular side wall 22 of assembly 10 is made up of the two annular portions 28 and 32, of the upper and lower sections 24, 26, fixedly held together, in any conventional manner, as by gluing. A reduced end portion 33 of annular portion 32, is captured in an annular opening 29 formed in upper section 24 between annular portion 28 and the annular segment 25. This structure, together with positioning and strengthening means 47, 48 is described in more detail below, and adds to the overall strength of the compact assembly 10, to allow it to withstand the high pressures that may occur in some water systems, or if any filtering media 49 held within chamber 18 becomes clogged or causes a pressure buildup in assembly 10.

A substantially circular, curved flow deflector baffle 50 is held within the chamber 18, immediately below an inlet filter screen 52, to deflect water entering chamber 18 from shower arm 12 via inlet 14 evenly through the filter media 49, which substantially fills the chamber 18 and which is held therein by means of the filter screens 36 and 52. The diameter of circular baffle 50 is substantially less than that of chamber 18. The positioning and strengthening means 47, 48 comprises a plurality of pins 47 which are inserted into a plurality of tubular openings 48, when the sections 24 and 26 are fixed together, and are also glued or otherwise bonded together, in a known manner, to further strengthen the assembly 10. As shown in FIG. 2, pins 47 are formed integrally with the interior surface of lower wall 23 and the upper surface of baffle 50, and extend into chamber 18. The tubular openings 48 are formed integrally with the lower surface of baffle 50 and the interior surface of upper wall 20, and coact with the pins 47 to both strengthen the chamber 18, and therefore the assembly 10, and maintain the baffle 50 in the proper position within chamber 18, directly adjacent the inlet 14.

In use, the shower filter assembly 10 of the present invention is used to dechlorinate water and to both save water and energy. When assembly 10 is secured to the end of a shower arm 12, because of its compact, low-profile shape, it will not extend out too far from the end of the shower arm, even if the compact shower head 38 is mounted on the end of outlet 34. In the preferred embodiment of the invention, the overall length of the assembly 10, from the top wall 20 to the end of the spray adjustment means 40 of the shower head 38, when it is threaded on outlet 34, is approximately three and three quarters inches long. This compares favorably with existing shower heads alone, and is substantially smaller than currently available shower filters, when they are combined with shower head and shut-off valve arrangements. These existing arrangements are about nine inches in length, and cause considerable problems when used in showers, especially those with a lack of adequate space in them, to begin with.

The preferred dechlorination media 49 placed in the chamber 18 is KDF, a commercially available dechlorinating material. This media dechlorinates the water passing through the chamber, particularly for those persons who are allergic to chlorine, or who, for any other reason wish to dechlorinate or filter the water they shower with. However, it is to be understood that other filtering media may be placed in chamber 18, depending on the local conditions of the water in the area where the assembly is to be installed.

The compact, or low-profile design, of assembly 10 is made possible by the use of the following unique elements: the recessed inlet means 14; the flow deflecting baffle 50 within chamber 18, adjacent inlet 14 to extend the water path and the positioning and strengthening means 47, 48, which allow the unique flat design of chamber 18 to be used; the placement of the shut-off valve in the outlet means 34; and the use of compact shower head 38, mounted on the outlet 34, with a rotary spray adjustment means 40.

Figure 3:
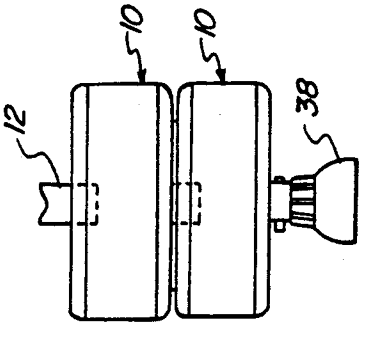
FIG. 3 is a schematic view showing two compact shower filter assemblies nested together.

If the water to be filtered by the assembly of the present invention is to be treated more than once, or has to remove specific materials in stages, or because of some other reason, the assembly of the present invention may be easily modified so as to nest a plurality of assemblies together. This is easily accomplished, by fabricating assemblies without openings 42 and valves 44 therein, and removing the shower head 38 therefrom. The threaded end of an outlet 34 with the shower head 38 removed may then be screwed into and securely held within the recessed inlet 14 of a further assembly or assemblies, as needed or desired. It, therefore, can be seen that as many assemblies, without openings 42 and valves 44, and with shower heads 38 removed from their ends, may be fixed or nested together to serially filter water flowing therethrough, as shown in FIG. 3.

Accordingly, as will be apparent to those skilled in the art, the present invention assembly provides considerable advantages in ease and flexibility of manufacture, installation and removal, and takes up a minimum amount of space in use.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What I claimed is:

1. A compact, low profile shower filter assembly comprising:

a substantially thin, cylindrical hollow body having two substantially flat, circular end walls and an annular side wall permanently fixed together to form a hollow chamber therein with inlet and outlet means connected thereto to allow the flow of water into and out of said chamber;

a substantially circular, curved baffle deflector mounted within said chamber a predetermined distance from said inlet means;

said baffle, having a diameter less than that of said chamber, is carried in said chamber with a curved surface thereof facing said inlet means by a plurality of pins secured to said baffle and an interior surface of one of said circular end walls; said pins being permanently captured in a plurality of tubular openings secured to said baffle and an interior surface of the other of said circular end walls; said pins and tubular openings both positioning said baffle within said chamber and strengthening said shower filter assembly by permanently holding said substantially flat circular end walls and said baffle together;

a filter media substantially filling said chamber; and said inlet means being recessed into said chamber to thereby further reduce the size of said filter assembly; said inlet means being adapted to be connected to a threaded pipe whereby water flowing through said inlet means impinges on said baffle for substantially even distribution through said filter media in said chamber.

2. The compact shower filter of claim 1, further including a shut-off valve in said outlet means.

3. The compact shower filter of claim 2 wherein said outlet means includes screw threads formed on the end thereof, and a compact shower head having threads formed thereon is secured to the threaded end of said outlet means.

4. The compact shower filter of claim 1, further including screw threads formed on a portion of said outlet means and a compact shower head having screw threads formed thereon mounted on said threaded portion of said outlet means; said compact shower head having a rotatable spray adjustment means mounted therein.

5. The compact shower filter of claim 4 wherein a slidable shut-off valve is mounted within said outlet means.

6. The compact shower filter of claim 1 wherein an identical second compact shower filter may be nested together with said compact shower filter with the outlet means of said second compact shower filter inserted into and captured in the recessed inlet means of said compact shower filter.

7. A low profile, compact shower filter assembly including:

a substantially thin, flat cylindrical body comprised of two separate sections fixed together to form two substantially flat, circular end walls and an annular side wall bounding a hollow inner chamber having a filter media therein;

a recessed water inlet connected to said chamber and extending from one of said flat end walls into said chamber;

a substantially circular, curved baffle deflector mounted within said chamber adjacent said inlet, the diameter of said circular baffle deflector being substantially less than that of said chamber;

a plurality of baffle positioning and strengthening means permanently fixed to said circular baffle deflector and an interior surface of each of said flat end walls holding said flat end walls and said circular baffle deflector together; and a water outlet, mounted on the other of said flat end walls, connected to said chamber and extending away from said chamber and said other of said flat end walls.

8. The compact shower filter of claim 7 wherein said plurality of baffle positioning and strengthening means is comprised of a plurality of pins formed within said chamber on the interior surface of one of said flat end walls and a surface of said circular baffle deflector, inserted into and held within a plurality of tubular openings formed on a surface of said circular baffle deflector and the interior surface of the other of said flat end walls.

9. The compact shower filter of claim 8, further including a shut-off valve mounted within said outlet.

10. The compact shower filter of claim 9 wherein said outlet includes threads formed on a portion of the exterior thereof; and a compact shower head having threads formed on the interior thereof is mounted on said threaded portion of said outlet.

11. The compact shower filter of claim 7, further including a shut-off valve slidably mounted within an opening formed in said outlet.

12. The compact shower filter of claim 7 wherein said outlet is threaded on a portion thereof and a compact shower head having a threaded portion and a rotatable spray adjustment means is mounted on said threaded portion of said outlet.

13. A low profile, compact shower head, water filter and shut-off valve comprising in combination:

a cylindrical body composed of two substantially thin cylindrical sections, permanently fixed together to form a substantially thin, hollow internal chamber having two substantially flat, circular end walls, an annular side wall, an inlet and an outlet;

a dechlorinating media held in and substantially filling said substantially thin chamber;

said inlet being recessed so as to have one end thereof extend into said substantially thin chamber;

curved baffle deflector means positioned within said substantially thin chamber adjacent said one end of said recessed inlet; said curved baffle deflector means deflecting water flowing into said substantially thin chamber from said inlet substantially evenly into said dechlorinating media;

said two substantially flat, circular end walls have inner and outer surfaces and said curved baffle deflector means having upper and lower surfaces; a plurality of pins formed on said inner surface of one of said substantially flat, circular end walls and one of said surfaces of said curved baffle deflector means and extending into said substantially thin chamber; and a plurality of tubular openings formed on said inner surface of the other of said substantially flat, circular end walls and the other of said surfaces of said curved baffle deflector means, with said plurality of tubular openings being aligned with said plurality of pins, and permanently capturing said pins therein to both properly position said curved baffle deflector means in said substantially thin chamber and to strengthen said water filter by fixing said substantially flat, circular walls and said curved baffle deflector means together;

a shut-off valve slidably mounted within an opening formed in said outlet and adapted to control the flow of filtered water exiting from said substantially thin chamber; and a compact shower head having an outer body and a threaded inlet mounted on a threaded portion of said outlet after said shut-off valve.

14. The compact shower head, water filter and shut-off valve of claim 13 wherein said annular side wall is comprised of two annular portions formed integrally with said two substantially flat, circular end walls; said two annular portions being permanently fixed together.

15. The compact shower head, water filter and shut-off valve of claim 14 wherein one of said annular portions extending from one of said substantially flat, circular end walls includes a reduced end portion, captured within and securely held in an annular opening formed between said annular portion of the other of said substantially flat, circular end walls and an annular segment formed integrally with the other of said substantially flat, circular end walls.

* * * * *